United States Patent
Ratiu et al.

(10) Patent No.: US 10,118,474 B2
(45) Date of Patent: Nov. 6, 2018

(54) SEALING ASSEMBLY FOR AUTOMOTIVE GLASS

(71) Applicant: GM GLOBAL TECHNOLOGY OPERATIONS LLC, Detroit, MI (US)

(72) Inventors: Sorin Ratiu, Macomb, MI (US); Michael D. Richardson, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/468,685

(22) Filed: Mar. 24, 2017

(65) Prior Publication Data

US 2018/0272849 A1 Sep. 27, 2018

(51) Int. Cl.
| | |
|---|---|
| *B60J 10/18* | (2016.01) |
| *F16J 15/02* | (2006.01) |
| *B60J 10/27* | (2016.01) |
| *B60J 10/70* | (2016.01) |
| *B60J 10/16* | (2016.01) |

(52) U.S. Cl.
CPC .............. *B60J 10/27* (2016.02); *B60J 10/16* (2016.02); *B60J 10/18* (2016.02); *B60J 10/70* (2016.02); *F16J 15/025* (2013.01)

(58) Field of Classification Search
CPC ... B60J 10/16; B60J 10/18; B60J 10/27; B60J 10/70; F16J 15/025
See application file for complete search history.

(56) References Cited

U.S. PATENT DOCUMENTS

| | | | | |
|---|---|---|---|---|
| 2010/0320797 | A1* | 12/2010 | Schlater ................ | B60J 10/70 296/93 |
| 2011/0285177 | A1* | 11/2011 | Flammer ............... | B60J 10/265 296/208 |
| 2014/0327267 | A1* | 11/2014 | Deussen ................ | B60J 10/18 296/93 |
| 2016/0001645 | A1* | 1/2016 | Ortmueller ........... | B60J 10/18 403/288 |

* cited by examiner

*Primary Examiner* — Gilbert Y Lee

(57) ABSTRACT

A vehicle assembly includes a windshield having a fore edge and a body panel having an aft edge. The body panel includes an arm portion protruding from the aft edge and a tapered portion disposed at an interface between the aft edge and the arm portion. The arm portion has a distal end. The assembly further includes a sealing member with a first channel and a second channel. The fore edge is disposed in the first channel and the arm portion is disposed in the second channel. The second channel is defined by a first sidewall, a second sidewall, and an endwall. A protrusion extends from the second sidewall into the second channel and abuts the tapered portion. A band of material extends between the first sidewall and the second sidewall. The distal end abuts the band of material to secure the body panel between the band and the protrusion.

16 Claims, 2 Drawing Sheets

SEALING ASSEMBLY FOR AUTOMOTIVE GLASS

TECHNICAL FIELD

The present disclosure relates to window glass assemblies. More particularly, the present disclosure relates to a windshield assembly for an automotive vehicle having a sealing member disposed between windshield glass and a body panel of the vehicle.

INTRODUCTION

Automotive vehicles may be provided a variety of window glass assemblies, including fixed glass assemblies such as a windshield, rear window, and a sunroof. A seal or molding may be disposed at an interface between the window glass and a body panel of the vehicle adjacent to the window glass.

SUMMARY

A vehicle assembly according to the present disclosure includes a windshield having a fore edge and a body panel having an aft edge. The body panel additionally includes an arm portion protruding from the aft edge and a tapered portion disposed at an interface between the aft edge and the arm portion. The arm portion has a distal end. The assembly further includes a sealing member coupling the aft edge to the fore edge. The sealing member has a first channel and a second channel. The fore edge is disposed in the first channel and the arm portion is disposed in the second channel. The second channel is defined by a first sidewall, a second sidewall, and an endwall. The sealing member includes a protrusion extending from the second sidewall into the second channel and abutting the tapered portion. The second channel has a band of material extending between the first sidewall and the second sidewall. The distal end of the arm portion abuts the band of material to secure the body panel between the band of material and the protrusion.

In an exemplary embodiment, the first sidewall has a bent portion extending into the second channel and abutting the arm portion to secure the body panel between the bent portion and the protrusion.

In an exemplary embodiment, the band of material comprises an elastomer.

In an exemplary embodiment, the second channel has a first material composition and the band of material has a second material composition, with the second material composition having a lower elastic modulus than the first material composition.

In an exemplary embodiment, the body panel has a body panel upper surface and the sealing member has a sealing member upper surface. In such embodiments, the body panel upper surface and the sealing member upper surface are flush with one another.

In an exemplary embodiment, the windshield includes laminated window glass.

A method of assembly according to the present disclosure includes providing a windshield having a fore edge, a body panel having an aft edge, and a sealing member. The body panel has an arm portion protruding from the aft edge and a tapered portion disposed at an interface between the aft edge and the arm portion. The sealing member has a first channel and a second channel. The second channel is defined by a first sidewall, a second sidewall, and an endwall. A protrusion extends from the second sidewall into the second channel, and a band of material extends between the first sidewall and the second sidewall. The method additionally includes disposing the fore edge at least partially within the first channel. The method further includes inserting the arm portion at least partially into the second channel, such that the arm portion contacts the band of material and the tapered portion abuts the protrusion to secure the body panel between the band of material and the protrusion.

In an exemplary embodiment, the first sidewall has a bent portion extending into the second channel. In such an embodiment, inserting the arm portion at least partially into the second channel includes disposing the arm portion to abut the bent portion to secure the body panel between the bent portion and the protrusion.

In an exemplary embodiment, the band of material comprises an elastomeric material. In such an embodiment, inserting the arm portion at least partially into the second channel includes disposing the arm portion to contact the elastomeric material.

In an exemplary embodiment, the body panel has a body panel upper surface and the sealing member has a sealing member upper surface. In such an embodiment, inserting the arm portion at least partially into the second channel includes positioning the body panel upper surface and the sealing member upper surface flush with one another.

In an exemplary embodiment, providing a sealing member includes manufacturing the sealing member by coextrusion of the first channel, the second channel, and the band of material.

An assembly according to the present disclosure includes a first a first generally planar panel, a second generally planar panel, and a sealing member. The first panel has a first panel edge. The second panel has a second panel edge, an arm portion protruding from the second panel edge, and an engagement surface disposed proximate the aft edge. The sealing member couples the first panel edge to the second panel edge. The sealing member has a first channel with the first panel edge disposed at least partially therein and a second channel with the second channel edge and arm portion disposed at least partially therein. The second channel is defined by a first sidewall, a second sidewall, and an endwall. The sealing member includes a protrusion extending from the second sidewall into the second channel and contacting the engagement surface. The second channel has an elastomeric material disposed therein. The elastomeric material applies a bias force to the arm portion to secure the second panel between the band of material and the protrusion.

In an exemplary embodiment, the first sidewall has a bent portion extending into the second channel and abutting the arm portion to secure the second panel between the bent portion and the protrusion.

In an exemplary embodiment, the second channel has a first material composition and the elastomeric material has a second material composition, with the second material composition having a lower elastic modulus than the first material composition.

In an exemplary embodiment, the second panel has a second panel upper surface and the sealing member has a sealing member upper surface, the second panel upper surface and the sealing member upper surface being flush with one another.

In an exemplary embodiment, the first panel comprises laminated window glass.

Embodiments according to the present disclosure provide a number of advantages. For example, the present disclosure provides a system and method for assembling a fixed panel, such as a windshield, to an adjacent panel via a robust connection forming a tight seal. Moreover, systems and methods according to the present disclosure provide an aid in assembly via a visual indicator of whether installation is complete.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
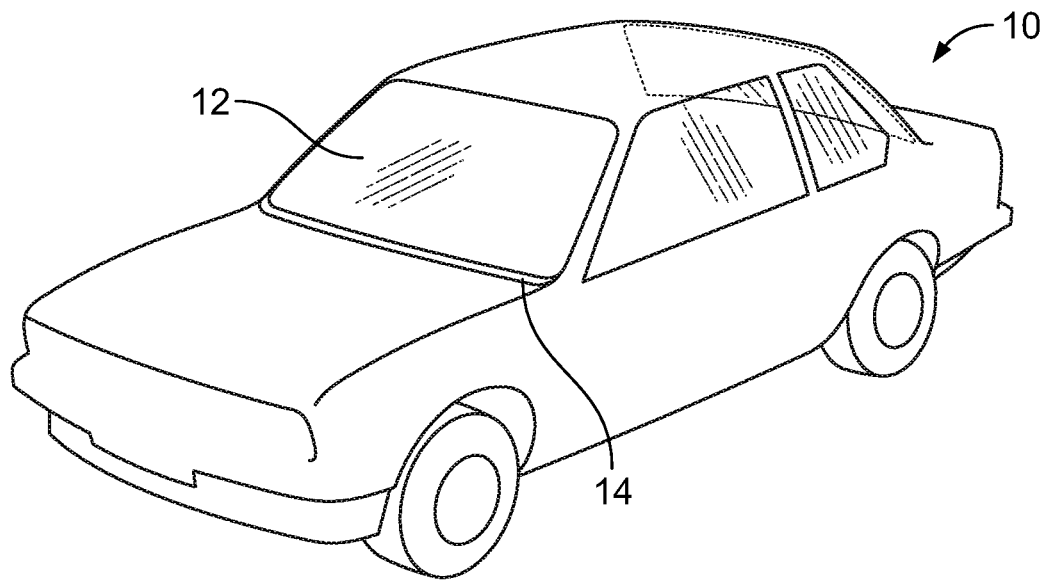
FIG. 1 is a view of a vehicle assembly according to the present disclosure.

Referring now to FIG. 1, an automotive vehicle 10 according to the present disclosure is illustrated. The automotive vehicle 10 includes a windshield 12. In this embodiment the windshield comprises a pane of laminated window glass. However, in other embodiments, the windshield may include other materials or be replaced by another type of panel such as a visual imaging display system. A body panel 14 is provided adjacent the windshield 12. The body panel 14 may be referred to as an air inlet panel. As will be discussed in further detail below, a sealing member is provided at the interface between the body panel 14 and the windshield 12, e.g. at a lower edge of the windshield 12.

Figure 2:
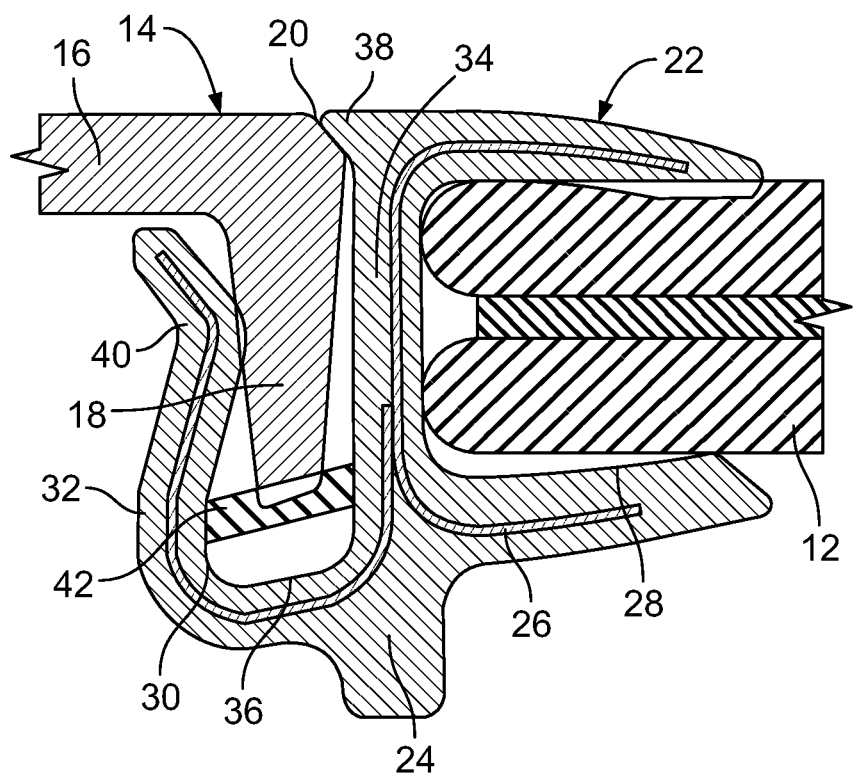
FIG. 2 is a first cross-sectional view of an assembly according to the present disclosure.

Referring now to FIG. 2, a cross-sectional view of a windshield assembly according to the present disclosure is shown. The windshield assembly includes the windshield 12 and a body panel 14. The body panel 14 includes a first portion 16 defining an exterior portion of the panel and an arm portion 18 extending at an angle from the first portion 16. A tapered edge 20 is provided at the interface between the first portion 16 and the arm portion 18.

A sealing member or molding 22 is disposed between an aft edge of the body panel 14 and a fore edge of the windshield 12. The sealing member 22 includes a body portion 24 disposed about a core 26. The body portion 24 is formed of a material having a first elastic modulus, and the core 26 is formed of a material having a second elastic modulus. The second elastic modulus is greater than the first elastic modulus, such that the core 26 defines a shape of the sealing member 22 and resists stretching. In an exemplary embodiment, the core 26 comprises a metal such as aluminum while the body portion 24 comprises a resilient plastic material.

The sealing member 22 includes a first channel 28 and a second channel 30. The arm portion 18 is disposed in the first channel 28, and the fore edge of the windshield 12 is disposed in the second channel 30.

The second channel 30 is defined by a first sidewall 32, a second sidewall 34, and an endwall 36. A protrusion 38 extends from the second sidewall 34 into the second channel 30 and abuts the tapered edge 20 of the body panel 14. The first sidewall 32 has a bent portion 40 extending into the second channel 30 and abutting the arm portion 18 of the body panel 14. The body panel 14 is thereby secured in a fore-aft direction between the bent portion 40 and the protrusion 38.

A band of material 42 is disposed in the second channel 30 proximate the endwall 36. The band of material 42 extends between the first sidewall 32 and second sidewall 34. In this embodiment a gap is maintained between the band 42 and the endwall 36; however, in alternative embodiments the band 42 may be disposed in contact with the endwall 36. An end of the arm portion 18 of the body panel 14 abuts the band of material. The body panel 14 is thereby secured in an up-down direction, e.g. orthogonal to the fore-aft direction, between the band 42 and the protrusion 38.

The band 36 comprises a material having a third elastic modulus. The third elastic modulus is less than the first elastic modulus. In an exemplary embodiment, the band 36 comprises an elastomeric material.

The sealing member 22 may be an extruded member, e.g. formed by coextrusion of the core 26, body 24 and band 42.

As may be seen, the body panel 14 is tightly secured to the sealing member 22 along two different directions, forming a tight seal between the tapered portion 20 of the body panel 14 and the protrusion 38 of the sealing member 22. Water intrusion into the second channel 30 is thereby inhibited.

Figure 3:
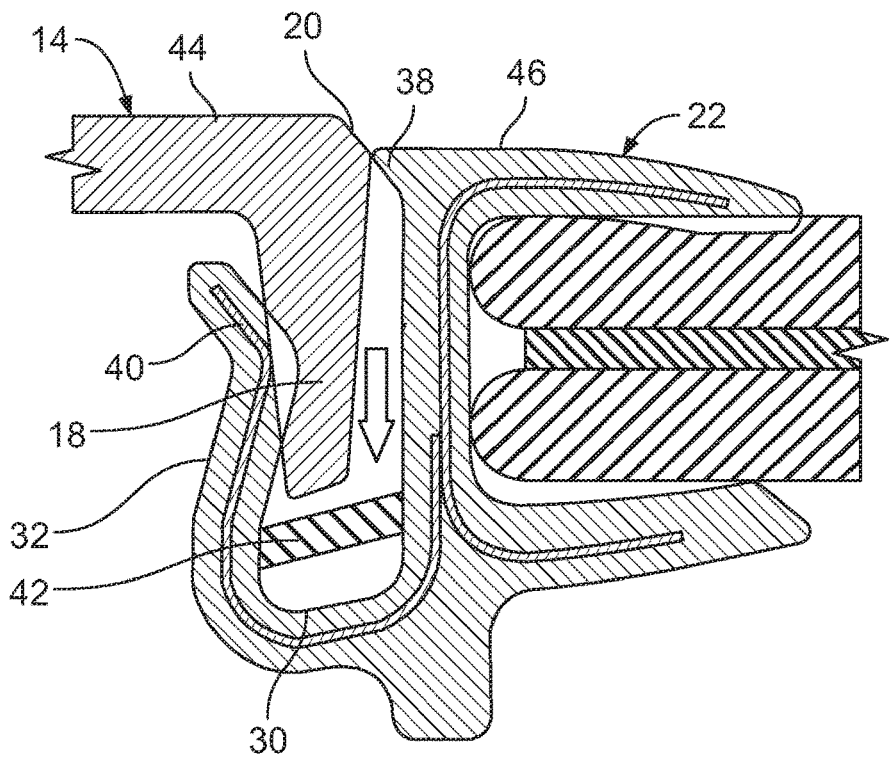
FIG. 3 is a second cross-sectional view of an assembly according to the present disclosure.

Referring now to FIG. 3, installation of the body panel 14 into the second channel 30 is illustrated. The arm portion 18 of the body panel 14 is inserted into the second channel 30, and the first sidewall 32 resiliently deflects to accommodate insertion of the arm portion 18. Until installation is successful, an upper surface 44 of the body panel 14 is not flush with an upper surface 46 of the sealing member 22, as depicted in FIG. 3. A downward force may then be applied to the body panel 14, as illustrated by the arrow. The arm portion 18 moves down into the second channel 30, and the bent portion 40 of the first sidewall 32 exerts an aftward force on the arm portion 18 to urge the body panel 14 into the installed position. When the body panel 14 is moved to a fully installed position, the end of the arm portion 18 contacts the band 42, and aftward force from the bent portion 40 causes the tapered edge 20 of the body panel 14 to seat against the protrusion 38 of the sealing member 22. In the installed position, the upper surface 44 of the body panel 14 is generally flush with the upper surface 46 of the sealing member 22. This configuration is shown in FIG. 2 and discussed above. As may be seen, the interface between the upper surface 44 of the body panel 14 and the upper surface 46 of the sealing member 22 thus provides a clear visual indication for an installer.

Figure 4:
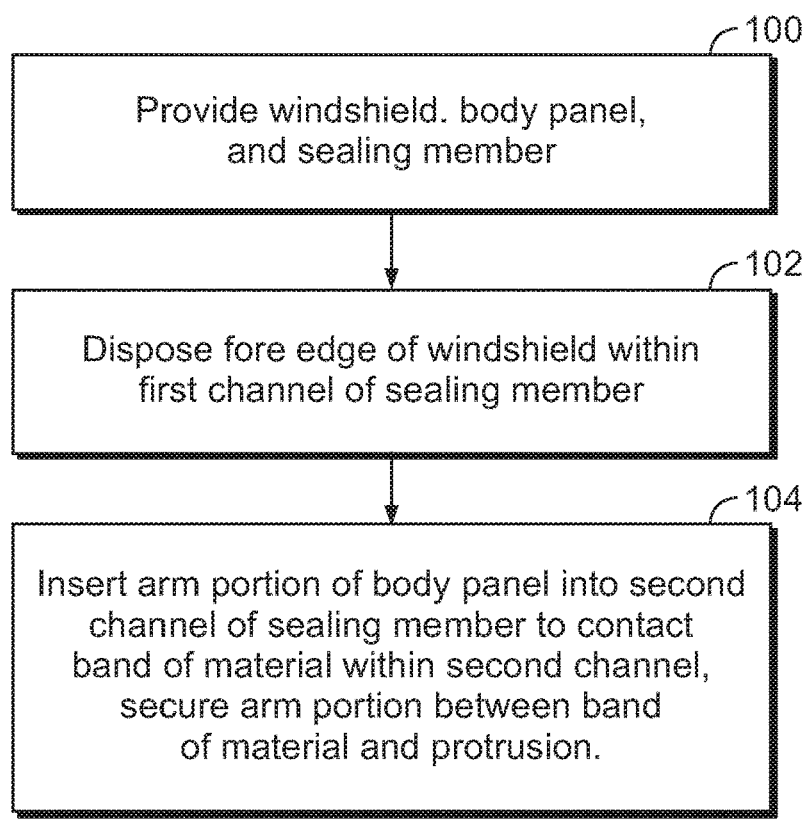
FIG. 4 is a flowchart representation of a method of assembly according to the present disclosure.

Referring now to FIG. 4, a method of assembling a windshield and body panel according to the present disclosure is illustrated. A windshield, a body panel, and a sealing member are provided, as illustrated at block 100. A fore edge of the windshield is disposed within a first channel of the sealing member, as illustrated at block 102. An arm portion of the body panel is inserted into a second channel of the sealing member, as illustrated at block 104. The arm portion contacts a band of material within the second channel to secure the arm portion between the band of material and a protrusion of the second channel.

While the embodiments discussed above are generally directed to a sealing member between a glass windshield and a body panel, one of ordinary skill in the art will appreciate that other embodiments are within the scope of the present disclosure. For example, other fixed glass assemblies, such as rear windows for automotive vehicles or various non-automotive applications, are within the scope of the present disclosure. In addition, in some vehicles such as autonomous vehicles the window glass may be replaced with a display screen such as a transparent LCD display. In such vehicles, a sealing member as discussed above may be implemented at an interface between the display screen and an adjacent body panel.

As may be seen, the present disclosure provides a system and method for assembling a fixed panel, such as a windshield, to an adjacent panel via a robust connection forming a tight seal. Moreover, systems and methods according to the present disclosure provide an aid in assembly via a visual indicator of whether installation is complete.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle assembly comprising:
    a windshield having a fore edge;
    a body panel having an aft edge, an arm portion protruding from the aft edge, and a tapered portion disposed at an interface between the aft edge and the arm portion, the arm portion having a distal end; and
    a sealing member coupling the aft edge to the fore edge, the sealing member having a first channel and a second channel, the fore edge being disposed in the first channel and the arm portion being disposed in the second channel, the second channel being defined by a first sidewall, a second sidewall, and an endwall, the sealing member including a protrusion extending from the second sidewall into the second channel and abutting the tapered portion, the second channel having a band of material extending between the first sidewall and the second sidewall, the distal end abutting the band of material to secure the body panel between the band of material and the protrusion; wherein the second channel has a first material composition and the band of material has a second material composition, the second material composition having a lower elastic modulus than the first material composition.

2. The vehicle assembly of claim 1, wherein the first sidewall has a bent portion extending into the second channel and abutting the arm portion to secure the body panel between the bent portion and the protrusion.

3. The vehicle assembly of claim 1, wherein the band of material comprises an elastomer.

4. The vehicle assembly of claim 1, wherein the body panel has a body panel upper surface and the sealing member has a sealing member upper surface, the body panel upper surface and the sealing member upper surface being flush with one another.

5. The vehicle assembly of claim 1, wherein the windshield comprises laminated window glass.

6. The vehicle assembly of claim 1, wherein the body panel has an interior surface and an exterior surface, the arm protruding from the interior surface at the aft edge, the tapered portion defining a portion of the exterior surface, wherein the protrusion is superposed over the tapered portion.

7. A method of assembly comprising:
    providing a windshield having a fore edge, a body panel having an aft edge, and a sealing member, the body panel having an interior surface, an exterior surface, an arm portion protruding from the interior surface at the aft edge, and a tapered portion of the exterior surface disposed at an interface between the aft edge and the arm portion, the sealing member having a first channel, a second channel defined by a first sidewall, a second sidewall, and an endwall, a protrusion extending from the second sidewall into the second channel, and a band of material extending between the first sidewall and the second sidewall;
    disposing the fore edge at least partially within the first channel; and
    inserting the arm portion at least partially into the second channel such that the arm portion contacts the band of material and the tapered portion abuts the protrusion to secure the body panel between the band of material and the protrusion with the protrusion superposed above the tapered portion of the exterior surface.

8. The method of claim 7, wherein the first sidewall has a bent portion extending into the second channel, and wherein inserting the arm portion at least partially into the second channel includes disposing the arm portion to abut the bent portion to secure the body panel between the bent portion and the protrusion.

9. The method of claim 7, wherein the band of material comprises an elastomeric material, and wherein inserting the arm portion at least partially into the second channel includes disposing the arm portion to contact the elastomeric material.

10. The method of claim 7, wherein the sealing member has a sealing member upper surface, and wherein inserting the arm portion at least partially into the second channel includes positioning the exterior surface and the sealing member upper surface flush with one another.

11. The method of claim 7, wherein providing a sealing member comprises manufacturing the sealing member by coextrusion of the first channel, the second channel, and the band of material.

12. An assembly comprising:
- a first generally planar panel with a first panel edge;
- a second generally planar panel with a second panel edge, an interior surface, an exterior surface, an arm portion protruding from the interior surface proximate the second panel edge, the exterior surface having an engagement surface disposed proximate the second panel edge; and
- a sealing member coupling the first panel edge to the second panel edge, the sealing member having a first channel with the first panel edge disposed at least partially therein and a second channel with the second channel edge and arm portion disposed at least partially therein, the second channel being defined by a first sidewall, a second sidewall, and an endwall, the sealing member including a protrusion extending from the second sidewall into the second channel and contacting and being superposed over the engagement surface, the second channel having an elastomeric material disposed therein, the elastomeric material applying a bias force to the arm portion to secure the second panel between the band of material and the protrusion.

13. The assembly of claim 12, wherein the first sidewall has a bent portion extending into the second channel and abutting the arm portion to secure the second panel between the bent portion and the protrusion.

14. The assembly of claim 12, wherein the second channel has a first material composition and the elastomeric material has a second material composition, the second material composition having a lower elastic modulus than the first material composition.

15. The assembly of claim 12, wherein the second panel has a second panel upper surface and the sealing member has a sealing member upper surface, the second panel upper surface and the sealing member upper surface being flush with one another.

16. The assembly of claim 12, wherein the first panel comprises laminated window glass.

* * * * *